United States Patent [19]

Ushitani

[11] 4,133,414
[45] Jan. 9, 1979

[54] DEVICE FOR EMERGENCY BRAKING AND PREVENTING AN AUTOMOBILE FROM SLIPPING SIDEWAYS

[76] Inventor: Fukuzo Ushitani, 209, Miyanoshita, Higashioshima, Amagasaki-shi Hyogo-ken, Japan

[21] Appl. No.: 799,317

[22] Filed: May 23, 1977

[51] Int. Cl.² ............................................. B60T 1/14
[52] U.S. Cl. ...................................................... 188/5
[58] Field of Search ................................. 188/5, 4 R

[56] References Cited

U.S. PATENT DOCUMENTS

| 1,708,081 | 4/1929 | Coate et al. | 188/5 |
| 1,753,588 | 4/1930 | Baillie | 188/5 |
| 2,068,472 | 1/1937 | Royer | 188/5 |
| 2,718,283 | 9/1955 | Ropp | 188/4 R |
| 3,799,293 | 3/1974 | Howells et al. | 188/5 |

FOREIGN PATENT DOCUMENTS 411175 6/1934 United Kingdom ................... 188/4 R Primary Examiner—Duane A. Reger
Attorney, Agent, or Firm—Wenderoth, Lind & Ponack

[57] ABSTRACT

A subsidiary brake pedal is provided in addition to a conventional brake pedal. It is so arranged that the subsidiary brake pedal is stepped on at the same time when the conventional brake pedal is stepped on. A ski type brake disc is provided between the rear wheels. The brake disc is linked with the subsidiary brake, and is capable of being raised or lowered. When the subsidiary brake pedal is stepped on, the ski type brake disc is pressed against the road surface to provide for emergency braking and for preventing an automobile from slipping sideways.

12 Claims, 13 Drawing Figures

Fig. 9
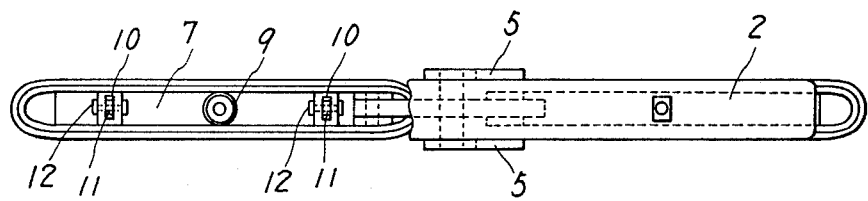
Fig. 10
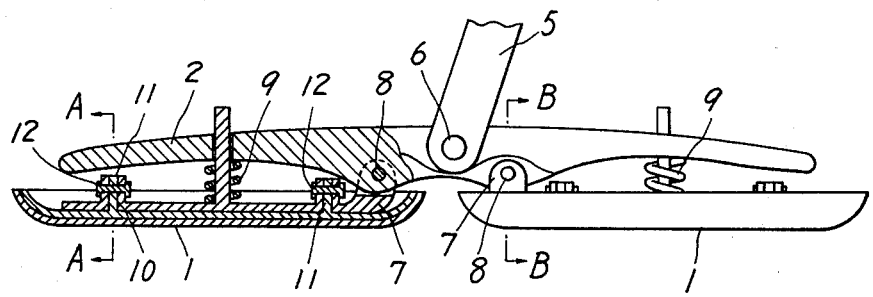
Fig. 11    Fig. 12    Fig. 13
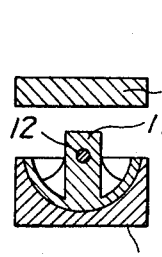 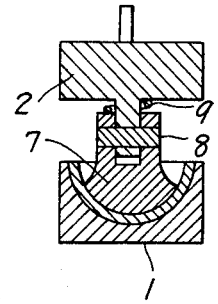 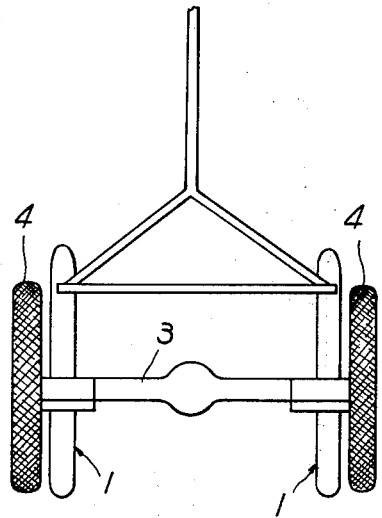

DEVICE FOR EMERGENCY BRAKING AND PREVENTING AN AUTOMOBILE FROM SLIPPING SIDEWAYS

This invention relates to a device for preventing an automobile from slipping sideways and for shortening a distance during which the automobile stops when an emergency brake is applied to it.

BACKGROUND OF THE INVENTION

In a conventional brake system of the automobile, friction created when a brake shoe is pushed to a brake drum will suddenly stop a rapidly rotating wheel, and another friction created thereby between a round tire and a road surface will stop the automobile. In this case the contact between the tire and the road surface is, so to speak, a linear contact, Thus, it requires a long distance during which the automobile stops because of an insufficient friction created between the tire and the road surface. Besides, in the case of a four-wheel vehicle, it is difficult to allow the four wheels to stop completely at the same time. Thus, there are differences in time before each wheel stops completely, and this causes the tires to slip sideways. These are the defects of the conventional brake system.

As the speed of automobiles becomes faster and highways are crowded with vehicles, a long brake stopping distance may cause an automobile to collide against another from behind, and an automobile slipping sideways causes it to be overthrown.

SUMMARY OF THE INVENTION

This invention eliminates these traffic accidents. This invention provides a subsidiary brake in addition to a conventional principal brake pedal. When the conventional brake pedal is stepped on, the subsidiary brake pedal is simultaneously stepped on. Then the conventional brake is allowed to start operation and the subsidiary brake is also allowed to start operation. This lowers a ski type brake disc linked to the subsidiary brake and provided on each side of a rear axle box. When the subsidiary brake is further stepped on, the brake disc is pressed, and thereby the weight of the automobile is applied to the brake disc rather than a wheel. Thus, as compared with a conventional contact area between a tire and a road surface, the frictional contact area with a road surface is increased. Besides, inertia slipping after the braking of the conventional principal brake may be made shorter. What is more, the lowered brake discs with their somewhat inclining operation on the back of the left and right sides, prevents the automobile from slipping sideways. Thus, when a fast running vehicle provided with the device of this invention stops suddenly in a very crowded highway, it will not collide against another vehicle from behind, nor will it slip sideways. It is possible, therefore, to prevent a vehicle from turning rapidly or from being overthrown, and thereby prevent another vehicle from colliding against it. In this case, the safety of the vehicle is secured by proportionally adjusting the pressures applied to a conventional wheel and to a ski type brake system, and by adjusting the resistance between the brake friction and a road surface.

BRIEF DESCRIPTION OF THE INVENTION

The invention will now be described in detail by way of example with reference to the accompanying drawings in which:

FIG. 9 is a plan view of the brake disc;

FIG. 10 is a side view of the brake disc;

FIG. 11 is a sectional view taken along line A — A of FIG. 10; FIG. 12 is a sectional view taken along line B—B of FIG. 10, and FIG. 13 is a plan view of an attaching material of the brake disc.

Figure 1:
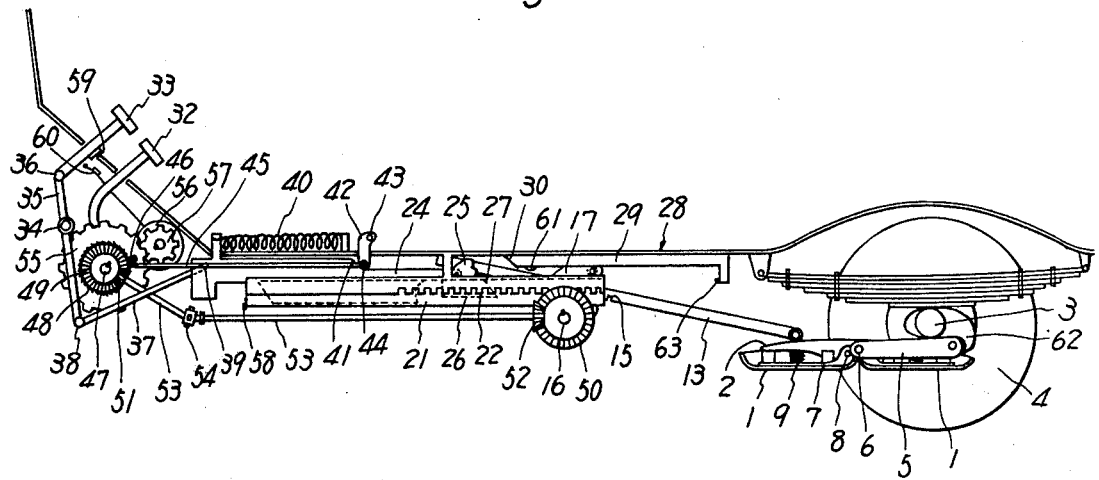
FIG. 1 is a side view of a whole structure.

Referring now to the drawings, the numeral 1 is a ski type brake disc 6 to 7 cm in width and 40 to 50 cm in length. This disc 1 is made from hard rubber, a synthetic resin, steel wires, or any other suitable material, which are stuck together. An attaching material 2 of the brake disc 1 is movably attached at its central portion to supporting legs 5 and 5 by means of shafts 6 and 6. The supporting legs 5 and 5 are provided on both inner lower sides of rear wheels 4 of a rear axle box 3, and are movable only in the advancing direction of the vehicle. One end of stands 7 and 7 for the brake disc 1 is movably attached by means of shafts 8 and 8 to each side near the shafts 6 and 6 which connect the attaching material 2 with the supporting legs 5 and 5. Springs 9 and 9 lie between the attaching material 2 and the stands 7 and 7 to allow the front and rear ends of the brake disc 1 to go up and down slightly (about 3 to 4 cm). Penetrating holes 10 and 10 are dug through the stands 7 and 7 and further through projections 11 and 11 provided on the upper surface of the brake disc 1. Holes in a front and rear direction are dug through said projections 11 and 11, and the brake discs 1 and 1 are movably attached to the stands 7 and 7 by shafts 12 and 12. Thus, the brake disc so provided is capable of inclining to the left and right.

Figure 5:
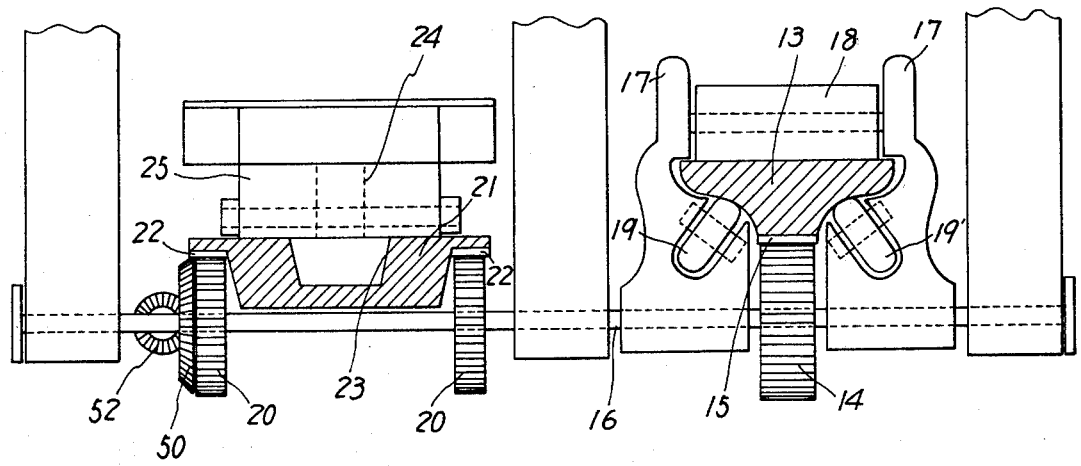
FIG. 5 is a sectional view taken along line A — A in FIG. 4.
Figure 6:
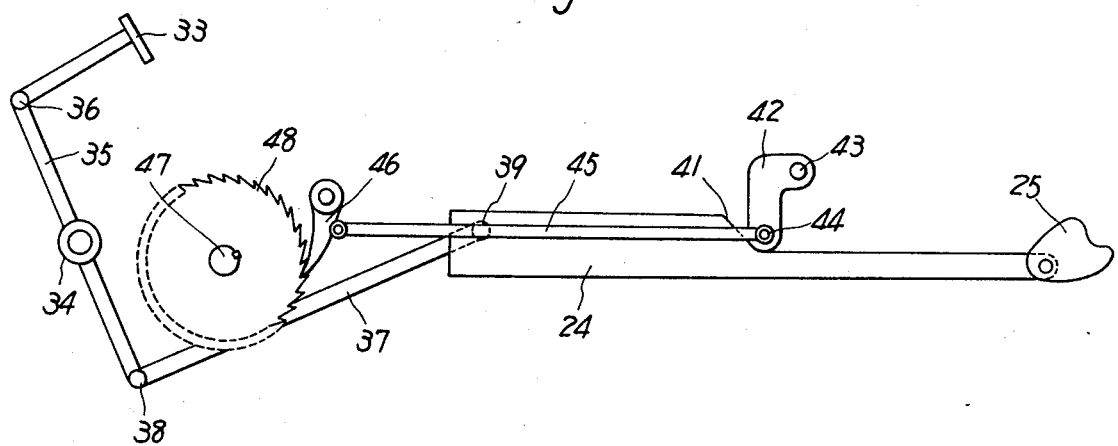
FIG. 6 is a side view of a pressing rod.
Figure 7:
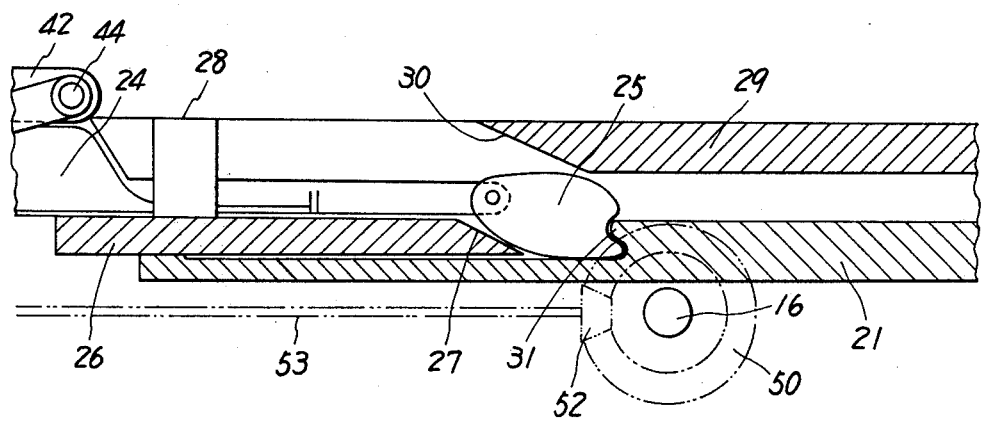
FIG. 7 is a descriptive view as seen from the side with a portion cut when the pressing rod is engaged.
Figure 8:
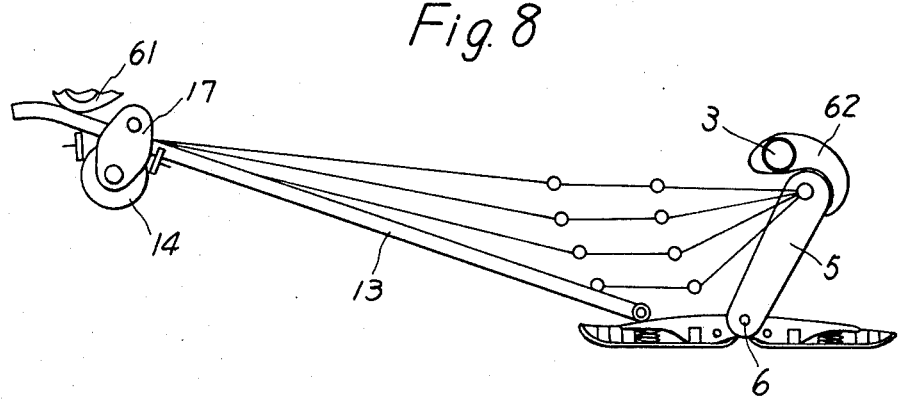
FIG. 8 is a descriptive view as seen from the side showing successive stages in which the brake disc reaches the road surface.

An ascending and descending rod 13 for the brake disc 1 is movably attached to the front side of the attaching material 2 of the brake disc 1. This rod 13 is provided at its top with a rack 15 which gears with an elevating gear 14. The gear 14 is fixed to a shaft 16 in front of the rear axle box 3. A frame 17 wraps the elevating year 14 and the shaft 16. The ascending and descending rod 13 is supported in three directions by rollers 18, 19 and 19', as shown in FIG. 5, so that the rack 15 of the rod 13 engages with the elevating gear 14 within the frame 17. Two traveling gears 20 and 20 are provided at a proper distance from each other on the shaft 16 coaxially with the elevating gear 14. The two traveling gears have the same number of teeth and the same module. A traveling rod 21 is in such a form as shown in FIG. 5 and has racks 22, 22 formed on the lower sides of both of its edges. The racks 22, 22 engage the traveling gears 20, 20, It is so provided that when the traveling gears 20, 20 engage the racks 22 and 22 and rotate together, the traveling rod 21 travels in a space between the traveling gears 20, 20. A groove 23 is formed in the upper surface of the traveling rod 21, and a pressing rod 24 slides back and forth over the groove 23. A pressing piece 25 is movably attached to the top of the pressing rod 24. The pressing piece 25 is wider than the groove 23, and slides over the traveling rod 21. A lower fixed guide 26 has, as shown in FIG. 7, has an upward facing inclined surface 27 at its rear edge and is inserted into said rod 23, and an upper part of the lower fixed guide 26 is fixed to a chassis 28. An upper fixed guide 29 has a downward inclined surface at its forward end, and is fixed to the chassis 28 at a location above the groove 23 so that the upward and the downward facing inclined surfaces 27 and 30 stand face to face. A hook 31 for the pressing piece 25 is formed in a forward area of the groove 23 of the traveling rod 21. The pressing piece 25 is so provided as to engage the hook 31 when the pressing piece 25 goes downwards by being led by the upper and lower fixed guides 26 and 29 and when the brake disc 1 stops with a narrow space between it and a road surface.

A subsidiary brake pedal 33 is provided above a conventional brake pedal 32. One end of a lever 35, with its fulcrum 34 movably supported, is movably attached to the lower portion of the subsidiary brake pedal 33 by means of a shaft 36, and the other end of the lever 35 is movably attached to a link 37 by means of a shaft 38. The top of the link 37 is movably attached to the forward end of the pressing rod 24 by means of a shaft 39. When the subsidiary brake pedal 33 is stepped on, the lever 35 and the link 37 will cause the pressing rod 24 to go backwards, and thereby cause the pressing piece 25 at the top of the pressing rod 24 to engage with the hook 31 of the traveling rod 21. A spring 40 presses the pressing rod 24 forwards at all times. An inclined surface 41 is formed at a central upper portion of the pressing rod 24. A cam 42 is movably attached at its upper end to the chassis 28 by means of a shaft 43 is such a manner that the lower portion of the cam 42 is located at the lower portion of the inclined surface 41.

A ratchet wheel 48 is fixed to a shaft 47 which is situated below the brake pedal 32 and a subsidiary brake pedal 33, and a pawl 46 is provided at the top of a rod 45. The rod 45 is movably attached to the cam 42 by means of a shaft 44. With the retreat of the pressing rod 24, the inclined surface 41 of the pressing rod 24 raises the lower portion of the cam 42 horizontally. This causes the pawl 46 provided at the top of the rod 45 to retreat by means of the rod 45 movably attached to the lower portion of the cam 42 by means of the shaft 44, and allows the ratchet wheel 48 to rotate.

A bevel gear 49 is fixed on the shaft 47 coaxially with the ratchet wheel 48. A bevel gear 50 is fixed on the shaft 16 coaxially with the elevating gear 14 and traveling gears 20, 20. Small bevel gears 51 and 52 engage with the bevel gears 49 and 50 respectively. A shaft 53 connects small bevel gears 51 with 52 and has a universal joint 54 in the middle thereof. A hoisting wheel gear 55 is fixed on the shaft 47 provided coaxially with the bevel gear 49. The hoisting wheel gear 55 engages and rotates with a pinion 57 which is fixed on a motor 56.

When the hoisting wheel gear 55 and the bevel gear 49 coaxially provided on the shaft 47 rotate, the bevel gear 50 will rotate through the small bevel gear 51, the shaft 53 the universal joint 54, the shaft 53 and the small bevel gear 52. This in turn will rotate the elevating gear 14 and the travelling gears 20 and 20 provided coaxially with the bevel gear 50 on the shaft 16. The rotation of the elevating gear 14, in cooperation with the rack 15, will raise the ascending the descending rod 13, and thereby raise the brake disc 1. Also the rotation of the traveling gears 20 and 20, in cooperation with the racks 22 and 22 engaging therewith, will cause the traveling rod 21 to advance. On this occasion the pressing rod 24 advances by the operation of the spring 40. The cam 42 stands vertically along the inclined surface 41 of the pressing rod 24, and the rod 45, movably attached to the lower portion of the cam 42 by means of a shaft 44, advances, and thereby the pawl 46 provided at the top of the rod 45 is inserted into the ratchet wheel 48 so as to prevent the ratchet wheel 48 from moving downwards below the brake disc 1.

A limit switch 58 is provided in the front area of the traveling rod 21, and limits the hoisting of the brake disc 1 by the motor 51. When the front area of the traveling rod 21 comes in contact with the limit switch 58, the electric power source of the motor 56 is cut off, and the pawl 46 engages the ratchet wheel 48. A projection 59 is provided on a side of the subsidiary brake pedal 33. A limit switch 60 turns the motor 56 in a direction in which the brake disc 1 goes downwards when the subsidiary brake 33 is stepped on, and in a direction in which the brake disc goes upwards when the foot leaves the subsidiary brake pedal 33. A bumper 61 stops the brake disc 1 with a narrow space between the brake disc 1 and the road surface when the ascending and descending rod 13 goes down. The bumper 61 is fixed on the chassis 28 above the ascending and descending rod 13. A bumper 62 for the supporting legs 5 and 5 is fixed on the rear axle box 3.

The construction of this invention is as has been described above. The brake disc 1 will go down in the following manner. When the subsidiary brake pedal 33 is stepped on, the pressing rod 24 will retreat against the spring 40 through the lever 35 and the link 37, and the inclined surface 41 in the middle of the pressing rod 24 wll raise the cam 42 backwards to make it horizontal. Thus, the rod 45, movably attached to the lower end of the cam 42 by means of a shaft 44, will move backwards to release the pawl 46 from the rachet wheel 48 and to allow the projection 59 to pass through the limit switch 60. Thus, the motor 56 will turn in a direction in which the brake disc 1 goes down. This, together with the weight of the brake disc 1, will transfer the rotating motion from the pinion 57 to the wheel gear 55, which will rotate the bevel gear 49 coaxially provided with the wheel gear 55 on the shaft 47, and through the small bevel gear 51 engaging with the bevel gear 49, the shaft 53, the universal joint 54, the shaft 53, and the small bevel gear 52, the elevating gear 14 and the traveling gears 20 and 20 will rotate. By rotating the elevating gear 14, the ascending and descending rod 13 goes down through the rack 15 engaging with the elevating gear 14.

Figure 2:
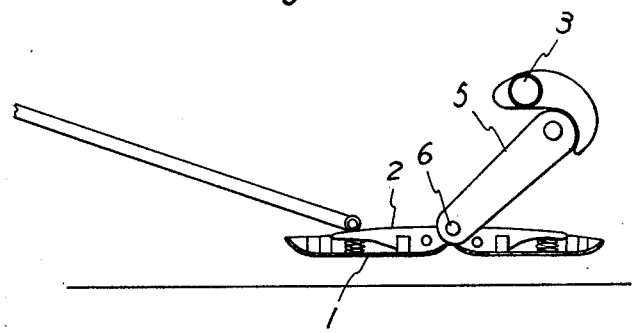
FIG. 2 is a side view of essential elements before a brake disc reaches a road surface.
Figure 3:
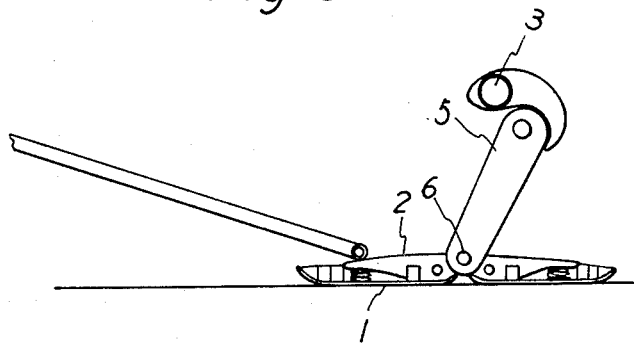
FIG. 3 is a side view of essential elements when the brake disc reaches the road surface.
Figure 4:
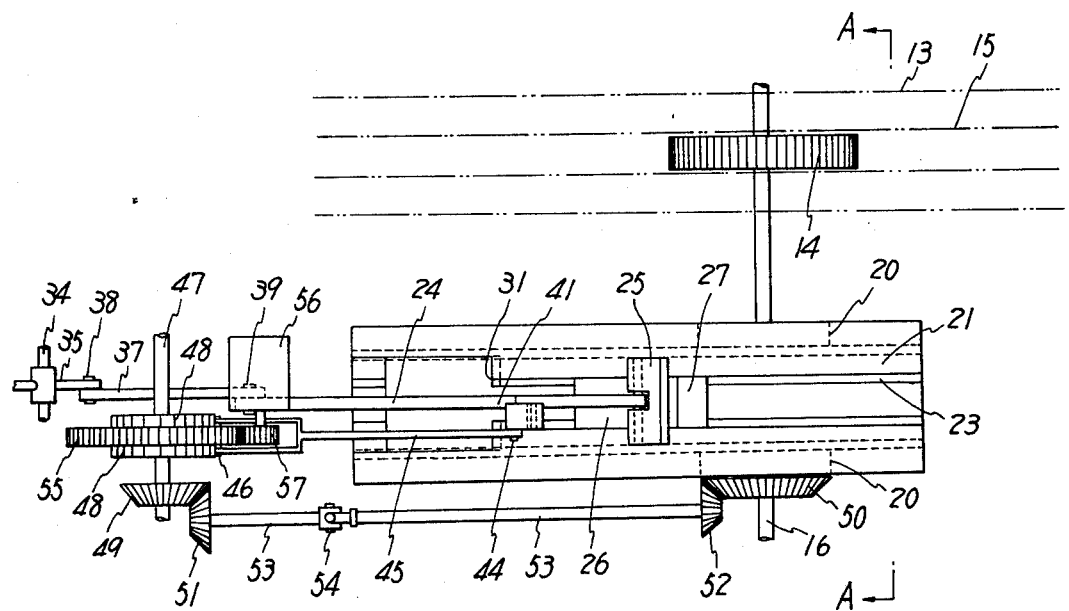
FIG. 4 is a plan view of essential elements for raising or lowering the brake disc.

Here the ascending and descending rod 13 and the supporting legs 5 and 5 will be supported by the bumpers 61 and 62 respectively, and the brake disc 1 will automatically stop at an area with a narrow space between it and the road surface, as shown in FIG. 2, by a contact of the rear end of the traveling rod 21 with the limit switch 63 provided in the chassis. Next, the traveling gears 20 and 20, provided coaxially with the elevating gear 14 on the shaft 16 will rotate simultaneously with the elevating gear 14, and cause the traveling rod 21 to go backwards through the racks 22 and 22 engaging the traveling gears 20 and 20, and the hook 31 provided in the front area of the traveling rod 21 will come directly below the upward and downward facing inclined surfaces 27 and 30 of the lower and upper fixed guides 29 and 26 respectively.

When the subsidiary brake pedal 33 is further stepped on, the pressing rod 24 will further retreat through the lever 35 and the link 37, and the pressing piece 25, provided at the rear of the pressing rod 24, will be led by the upward and downward facing inclined surfaces 27 and 30 to be hooked by the hook 31, and will cause the traveling rod 21 to go backwards further, rotate the ascending and descending gear 14, provided coaxially with the traveling gears 20 and 20 on the shaft 16, and cause the ascending and descending rod 13 to go down further to bring the brake disc 1 into contact with the road surface. Here the friction between the brake disc 1 and the road surface will shorten the brake stopping distance of the vehicle, and prevent the vehicle from slipping sideways.

Next, the brake disc 1 will go up in the following manner. When the subsidiary brake pedal 33 is released from a stepping foot, the pressing rod 24 will advance by the elasticity of the spring 40, and the subsidiary brake pedal 33 will go up through the link 37 and the lever 35. Then the projection 59 of the subsidiary brake pedal 33 will pass through the limit switch 60 in a direction opposite to the previous direction, and so the motor 56 will turn in a direction in which the brake disc 1 goes up. Here the cam 42 will return to a vertical position along the inclined surface 41 in the middle of the pressing rod 24, and so the rod 45 will advance to insert the pawl 46 provided in the front area thereof into the ratchet wheel 48. But this will not prevent the ratchet wheel 48 from rotating in a direction in which the brake disc 1 goes up.

The rotation of the motor 56 in a direction in which the brake disc 1 goes up, will then be transferred to the hoisting wheel gear 55 through the pinion 57, and will cause the bevel gear 49, provided coaxially with the wheel gear 55 on the shaft 17, to rotate. This will cause the small bevel gear 52 to rotate through the small bevel gear 51 engaging with the bevel gear 49, and the shaft 53 with the universal joint there between, and then rotate the bevel gear 50 engaging with the small bevel gear 52. Since the bevel gear 50 is coaxial with the elevating gear 14 and the traveling gears 20 and 20 on the shaft 16, the rotation of the bevel gear 50 will lead to the rotation of the elevating gear 14, which, in cooperation with the rack 15, will raise the ascending and descending rod 13, and will simultaneously lead to the rotation of the traveling gears 20 and 20, which, in cooperation with the racks 22 and 22 will advance the traveling rod 21.

With the advance of the pressing rod 24, the pressing piece 25 engaged with the hook 31 of the traveling rod 21 will be led by the upward and downward inclined surface 27 and 30 of the lower and upper fixed guides 26 and 29 to slide the traveling rod 21. A contact of the forward end of the advancing traveling rod 21 with the limit switch 58, will cut off the electric power source for the motor 56 which has been rotating in a direction in which the brake disc 1 is raised, and will insert the pawl 46 into the ratchet wheel 48 to prevent the brake disc 1 from going downwards. This will complete the raising operation.

As shown in FIG. 13, it is possible to provide the brake disc 1 in one or two lines on the inside of the rear wheel. It is also possible to provide the device of this invention in two wheel vehicles.

What is claimed is:

1. A device for braking an automobile, said device comprising:
    ski-type braking means mounted on the axle between the rear wheels of said automobile for contacting the pavement beneath said automobile and for preventing said automobile from slipping sideways;
    rod and gear means connected to said braking means for raising and lowering said braking means toward and away from said pavement;
    motor means operatively connected to said rod and gear means for operating said rod and gear means, whereby operating said motor means causes said rod and gear means to raise and lower said braking means;
    pedal means attached through the floor board of said automobile and operatively connected to said rod and gear means for moving said rod and gear means and for starting the operation of said motor means in response to the movement thereof; and
    said rod and gear means is comprised of:
        an ascending and descending rod connected to one end to said braking means, said ascending and descending rod having a rack on the end thereof opposite said braking means;
        rotatable elevating gear means engaging said rack on said ascending and descending rod for raising and lowering said rod;
        bevel gear means coaxial with said elevating gear means at one end thereof for rotating said elevating gear means;
        motor gear means coaxial with the end of said bevel gear means opposite the end of said bevel gear means connected to said elevating gear means for rotating in conjunction with the operation of said motor means and for rotating said coaxially mounted bevel gear means, said motor gear means having at least one ratchet wheel coaxial with said bevel gear means;
        pawl means adjacent said ratchet wheel for engaging said ratchet wheel and locking the rotations of said motor gear means;
        pivotable cam means connected to the end of said pawl means opposite the end of said pawl means engaging said ratchet wheel for pivoting and forcing said pawl means toward and away from said ratchet wheel;
        a traveling rod having at least one geared rack on the underside thereof above and engagable with said elevating gear means and movable thereby;
        a spring-biased pressed rod mounted beneath the floor board of said automobile above said traveling rod, connected at one end to said pedal means and movable therewith, and adjacent and engagable with said pivotable cam means, whereby depressing said pedal means causes said pressing rod to move against the bias of said spring, pivot said cam means, and withdraw said pawl means from said ratchet wheel; and
        a pivotable pressing piece connected to the end of said pressing rod opposite the end connected to said pedal means and engagable with said traveling rod.

2. A device for braking an automobile said device comprising:

ski-type braking means mounted on the axle between the rear wheels of said automobile for contacting the pavement beneath said automobile and for preventing said automobile from slipping sideways;

rod and gear means connected to said braking means for raising and lowering said braking means toward and away from said pavement;

motor means operatively connected to said rod and gear means for operating said rod and gear means, whereby operating said motor means causes said rod and gear means to raise and lower said braking means;

pedal means attached through the floor board of said automobile and operatively connected to said rod and gear means for moving said rod and gear means and for starting the operation of said motor in response to the movement thereof; and said braking means is comprised of:

supporting leg members pivotally attached to and extending downward from the axle beneath the rear wheels of said automobile;

an attaching member pivotally attached in the center thereof to said leg members and pivotally attached to said rod and gear means; and a pair of spring-biased braking disc members pivotally attached to said attaching member, one of said disc members facing forward and the other rearward.

3. A braking device as claimed in claim 2, wherein said rod and gear means is comprised of:

an ascending and descending rod connected at one end to said braking means, said ascending and descending rod having a rack on the end thereof opposite said braking means;

rotatable elevating gear means engaging said rack on said ascending and descending rod for raising and lowering said rod;

bevel gear means coaxial with said elevating gear means at one end thereof for rotating said elevating gear means;

motor gear means coaxial with the end of said bevel gear means opposite the end of said bevel gear means connected to said elevating gear means for rotating in conjunction with the operation of said motor means and for rotating said coaxially mounted bevel gear means, said motor gear means having at least one ratchet wheel coaxial with said bevel gear means;

pawl means adjacent said ratchet wheel for engaging said ratchet wheel and locking the rotation of said motor gear means;

pivotable cam means connected to the end of said pawl means opposite the end of said pawl means engaging said ratchet wheel for pivoting and forcing said pawl means toward and away from said ratchet wheel;

a traveling rod having at least one geared rack on the underside thereof above and engagable with said elevating gear means and movable thereby;

a spring-biased pressing rod mounted beneath the floor board of said automobile above said traveling rod, connected at one end to said pedal means and movable therewith, and adjacent and engageable with said pivotable cam means, whereby depressing said pedal means causes said pressing rod to move against the bias of said spring, pivot said cam means, and withdraw said pawl means from said ratchet wheel; and a pivotable pressing piece connected to the end of said pressing rod opposite the end connected to said pedal means and engagable with said traveling rod.

4. A braking device as claimed in claim 3, further comprising guide means above and below said pressing rod and pressing piece for guiding said pressing piece into contact with said traveling rod.

5. A braking device as claimed in claim 3, further comprising:

first switching means adjacent said pedal means and connected to said motor means for starting said motor means in response to the depression and release of said pedal means;

second switching means connected to said motor means, positioned behind said traveling rod, and contactable by said traveling rod during the rearward movement of said traveling rod for stopping the operation of said motor means and the rotation of said elevating gear means, whereby movement of said traveling rod by said motor means is stopped; and third switching means connected to said motor means in front of said traveling rod for stopping the operation of said motor means when contacted during the forward movement of said traveling rod.

6. A braking device as claimed in claim 3, wherein said rotatable elevating gear means is comprised of:

a shaft beneath said ascending and descending rod;

an elevating gear coaxially mounted on said shaft and engaging said rack on said ascending and descending rod; and at least one traveling gear mounted on said shaft coaxially with said elevating gear and engagable with said rack on the underside of said traveling rod.

7. A braking device as claimed in claim 1, wherein said braking means is comprised of:

supporting leg members pivotally attached to and extending downward from the axle beneath the rear wheels of said automobile;

an attaching member pivotally attached in the center thereof to said leg members and pivotally attached to said rod and gear means; and a pair of spring-biased braking disc members pivotally attached to said attaching member, one of said disc members facing forward and the other, rearward.

8. A braking device as claimed in claim 7, wherein each of said spring-biased braking disc members is comprised of:

a brake disc;

a stand member pivotally attached beneath said attaching member and attached above said brake disc, said stand member having a shaft extending upward therefrom through said attaching member; and a spring surrounding said shaft between said stand member and said attaching member.

9. A braking device as claimed in claim 1, further comprising guide means above and below said pressing rod and pressing piece for guiding said pressing piece into contact with said traveling rod.

10. A braking device as claimed in claim 1, further comprising:
- first switching means adjacent said pedal means and connected to said motor means for starting said motor means in response to the depression and relese of said pedal means;
- second switching means connected to said motor means, positioned behind said traveling rod, and contactable by said traveling rod during the rearward movement of said traveling rod for stopping the operation of said motor means and the rotation of said elevating gear means, whereby movement of said traveling rod by said motor means is stopped; and
- third switching means connected to said motor means in front of said traveling rod for stopping the operation of said motor means when contacted during the forward movement of said traveling rod.

11. A braking device as claimed in claim 1, wherein said rotatable elevating gear means is comprised of:
- a shaft beneath said ascending and descending rod;
- an elevating gear coaxially mounted on said shaft and engaging said rack on said ascending and descending rod; and
- at least one traveling gear mounted on said shaft coaxially with said elevating gear and engagable with said rack on the underside of said traveling rod.

12. A braking device as claimed in claim 2, wherein each of said spring-biased braking disc members is comprised of:
- a brake disc;
- a stand member pivotally attached beneath said attaching member and attached above said brake disc, said stand member having a shaft extending upward therefrom through said attaching member; and
- a spring surrounding said shaft between said stand member and said attaching member.

* * * * *